US005608621A

United States Patent [19]
Caveney et al.

[11] Patent Number: 5,608,621
[45] Date of Patent: Mar. 4, 1997

[54] SYSTEM AND METHOD FOR CONTROLLING THE NUMBER OF UNITS OF PARTS IN AN INVENTORY

[75] Inventors: Jack Caveney, Hinsdale; James Winger, Tinley Park, both of Ill.

[73] Assignee: Panduit Corporation, Tinley Park, Ill.

[21] Appl. No.: 410,342

[22] Filed: Mar. 24, 1995

[51] Int. Cl.$^6$ .................................................. G06F 153/00
[52] U.S. Cl. ............................................ 395/216; 395/228
[58] Field of Search ................................ 364/401 R, 400, 364/468.01, 468.05, 468.09, 478.04, 478.02

[56] References Cited

U.S. PATENT DOCUMENTS

| | | | |
|---|---|---|---|
| 4,459,663 | 7/1984 | Dye | 364/200 |
| 4,648,023 | 3/1987 | Powell | 364/156 |
| 5,077,661 | 12/1991 | Jain et al. | 364/402 |
| 5,128,861 | 7/1992 | Kagami et al. | 364/403 |
| 5,168,445 | 12/1992 | Kawashima et al. | 364/403 |
| 5,224,034 | 6/1993 | Katz et al. | 364/401 |
| 5,237,496 | 8/1993 | Kagami et al. | 364/401 |
| 5,280,425 | 1/1994 | Hogge | 364/402 |
| 5,299,115 | 3/1994 | Fields et al. | 364/401 R |
| 5,311,438 | 5/1994 | Sellers et al. | 364/401 R |
| 5,313,392 | 5/1994 | Temma et al. | 364/401 R |
| 5,367,452 | 11/1994 | Gallery et al. | 364/401 R |
| 5,459,656 | 10/1995 | Fields et al. | 364/401 R |

OTHER PUBLICATIONS

Aucamp, Donald C. Ph.D., "How to Define Service to Reduce Operational Costs," *1985 Conference Proceedings, American Production & Inventory Control Society*, 1985, pp. 232–234.

Catuneanu, V. M. et al., "Optimum Allocation of Computer Spares for Three–Level Stocks," *Microelectron Reliab.*, vol. 27, No. 4, Pergamom Journals Ltd., 1987, pp. 643–646.

Casteel, Laura B., "Setting and Implementing Inventory Management Objectives in the 1990s; Their Effects on Service Level and ROI," *1990 Conference Proceedings, American Production & Inventory Control Society*, 1990, pp. 165–166.

Chikan, Attila, Ph.D., "A Method of Inventory Planning," *Engineering Costs and Production Economics*, vol. 6, Elsevier Scientific Publishing Company, Amsterdam, The Netherlands, 1982, pp. 59–65.

Groff, Gene K., "Optimal Inventory Investment Management," University of Georgia.

Harhalakis, George, Ph.D. et al., "A Dynamic Planning and Control System for Inventories of Raw Materials," *Production and Inventory Management Journal—Second Quarter 1989*, pp. 12–17.

(List continued on next page.)

Primary Examiner—Donald E. McElheny, Jr.
Attorney, Agent, or Firm—Seed and Berry LLP

[57] ABSTRACT

A computer system according to the present invention comprises in a preferred embodiment a memory, a processor, an input and an output. The computer system receives part data and forecast data for each part in an inventory, including the number of units in the inventory, the cost, and the forecast unit demand. The computer system uses the part data and forecast data for each part to optimize the number of units of each part in the inventory for a selected inventory investment or service level constraint. The computer system optimizes the number of units of each part in the inventory by determining the number of units for each part for which the marginal increase in the number of orders for the part filled from the inventory for each additional order stocked is equal to the marginal increase for every other part and for which either the inventory service level equals the service level constraint or the inventory investment equals the inventory investment constraint. The computer system then outputs a determined minimum unit replenishment quantity and a safety unit quantity for each part. The minimum unit replenishment quantities and the safety unit quantity are used to determine the number of units of each part used to resupply the inventory.

21 Claims, 14 Drawing Sheets

OTHER PUBLICATIONS

Masters, James M., "Determination of Near Optimal Stock Levels for Multi–Echelon Distribution Inventories," *Journal of Business Logistics,* vol. 14, No. 2, 1993, pp. 165–195.

Mehrez, A. and D. Ben–Arieh, "All–Unit Discounts, Multi–Item Inventory Model with Stochastic Demand, Service Level Constraints and Finite Horizon," *Int. J. Prod. Res.,* vol. 29, No. 8, 1991, pp. 1615–1628.

Mitchell, J. Christopher, "Multi–Item Inventory Systems with a Service Objective," *Operations Research,* vol. 36, No. 5, Sep.–Oct. 1988, pp. 747–755.

| PSL | MURQ | SUQ | EFFSO | AUEI | S |
|---|---|---|---|---|---|
| .999 | 189,727 | 93,380 | 140799 | 188244 | .14 |
| .998 | 189,727 | 82,708 | 140658 | 177572 | .22 |
| .997 | 189,727 | 76,038 | 140517 | 170902 | .29 |
| .996 | 189,727 | 71,036 | 140376 | 165900 | .39 |
| .995 | 189,727 | 67,367 | 140235 | 162231 | .39 |
| .994 | 216,831 | 61,364 | 140094 | 169780 | .54 |
| .993 | 189,727 | 61,031 | 139953 | 155895 | .54 |
| .992 | 216,831 | 56,028 | 139813 | 164444 | .62 |
| .991 | 216,831 | 53,694 | 139672 | 162110 | .72 |
| .990 | 216,831 | 51,693 | 139531 | 160109 | .87 |
| .985 | 216,831 | 43,022 | 138826 | 151438 | 1.14 |
| .980 | 216,831 | 36,685 | 138121 | 145101 | 1.36 |
| .975 | 216,831 | 31,349 | 137417 | 139765 | 1.51 |
| .970 | 216,831 | 26,680 | 136712 | 135096 | 1.81 |
| .965 | 216,831 | 22,678 | 136007 | 131094 | 2.17 |
| .960 | 216,831 | 19,343 | 135302 | 127759 | 2.17 |
| .955 | 216,831 | 16,008 | 134598 | 124424 | 2.41 |
| .950 | 216,831 | 13,007 | 133893 | 121423 | 2.41 |
| .945 | 216,831 | 10,339 | 133188 | 118755 | 2.71 |
| .940 | 216,831 | 7,671 | 132484 | 116087 | 3.10 |
| .935 | 216,831 | 5,003 | 131779 | 113419 | 3.62 |
| .930 | 216,831 | 2,668 | 131074 | 111084 | 3.61 |
| .925 | 216,831 | 334 | 130370 | 108750 | 3.62 |
| .920 | 216,831 | 0 | 129665 | 108416 | 0 |
| .915 | 189,727 | 667 | 128960 | 95531 | 0 |
| .910 | 189,727 | 0 | 128255 | 94864 | 0 |
| .905 | 189,727 | 0 | 127550 | 94864 | 0 |
| .900 | 189,727 | 0 | 126846 | 94864 | 0 |
| .890 | 189,727 | 0 | 125437 | 94864 | 0 |
| .880 | 189,727 | 0 | 124027 | 94864 | 0 |
| .870 | 189,727 | 0 | 122618 | 94864 | 0 |
| .860 | 189,727 | 0 | 121208 | 94864 | 0 |
| .850 | 189,727 | 0 | 119799 | 94864 | 0 |
| .840 | 189,727 | 0 | 118390 | 94864 | 0 |
| .830 | 189,727 | 0 | 116980 | 94864 | 0 |
| .820 | 189,727 | 0 | 115571 | 94564 | 0 |
| .810 | 189,727 | 0 | 114161 | 94864 | 0 |
| .800 | 189,727 | 0 | 112752 | 94864 | 0 |
| .750 | 189,727 | 0 | 105705 | 94864 | 0 |
| .700 | 189,727 | 0 | 98658 | 94864 | 0 |
| .650 | 189,727 | 0 | 91611 | 94864 | 0 |
| .600 | 189,727 | 0 | 84564 | 94864 | 0 |
| .550 | 189,727 | 0 | 77517 | 94864 | 0 |
| .500 | 189,727 | 0 | 70470 | 94864 | 0 |

*FIG. 8*

| S | ISL | II |
|---|---|---|
| .1 | 99.69 | 1,822,831.41 |
| .2 | 99.68 | 1,820,638.31 |
| .3 | 99.67 | 1,817,624.77 |
| .4 | 99.63 | 1,809,804.25 |
| .5 | 99.56 | 1,785,094.12 |
| .6 | 99.42 | 1,748,297.86 |
| .7 | 99.26 | 1,698,958.37 |
| .8 | 99.08 | 1,649,028.77 |
| .9 | 98.88 | 1,593,124.98 |
| 1.0 | 98.63 | 1,531,311.75 |
| 1.1 | 98.38 | 1,474,968.65 |
| 1.2 | 98.10 | 1,422,978.86 |
| 1.3 | 97.80 | 1,375,153.35 |
| 1.4 | 97.45 | 1,328,852.01 |
| 1.5 | 97.17 | 1,283,176.63 |
| 1.6 | 96.80 | 1,244,540.99 |
| 1.7 | 96.47 | 1,206,767.38 |
| 1.8 | 96.10 | 1,171,594.32 |
| 1.9 | 95.77 | 1,141,199.23 |
| 2.0 | 95.44 | 1,111,291.65 |
| 2.1 | 95.16 | 1,079,835.60 |
| 2.2 | 94.91 | 1,050,868.25 |
| 2.3 | 94.65 | 1,030,208.07 |
| 2.4 | 94.36 | 1,004,709.19 |
| 2.5 | 94.17 | 985,611.12 |
| 3.0 | 93.95 | 963,636.57 |
| 3.5 | 93.80 | 948,687.63 |
| 4.0 | 93.62 | 928,864.19 |
| 4.5 | 93.18 | 912,251.80 |
| 5.0 | 93.16 | 900,225.03 |

*FIG. 9*

| PSL | MURQ | SUQ | EFFSO | AUEI | S |
|---|---|---|---|---|---|
| .999 | 189,727 | 93,380 | 140799 | 188244 | 7.479606 |
| .998 | 189,727 | 82,708 | 140658 | 177572 | 7.921187 |
| .997 | 189,727 | 76,038 | 140517 | 170902 | 8.222092 |
| .996 | 189,727 | 71,036 | 140376 | 165900 | 8.461495 |
| .995 | 189,727 | 67,367 | 140235 | 162231 | 8.644174 |
| .994 | 216,831 | 61,364 | 140094 | 169780 | 8.251526 |
| .993 | 189,727 | 61,031 | 139953 | 155895 | 8.977414 |
| .992 | 216,831 | 56,028 | 139813 | 164444 | 8.502134 |
| .991 | 216,831 | 53,694 | 139672 | 162110 | 8.615847 |
| .990 | 216,831 | 51,693 | 139531 | 160109 | 8.714726 |
| .985 | 216,831 | 43,022 | 138826 | 151438 | 9.167177 |
| .980 | 216,831 | 36,685 | 138121 | 145101 | 9.518970 |
| .975 | 216,831 | 31,349 | 137417 | 139765 | 9.831968 |
| .970 | 216,831 | 26,680 | 136712 | 135096 | 10.119604 |
| .965 | 216,831 | 22,678 | 136007 | 131094 | 10.374777 |
| .960 | 216,831 | 19,343 | 135302 | 127759 | 10.590440 |
| .955 | 216,831 | 16,008 | 134598 | 124424 | 10.817664 |
| .950 | 216,831 | 13,007 | 133893 | 121423 | 11.026988 |
| .945 | 216,831 | 10,339 | 133188 | 118755 | 11.215385 |
| .940 | 216,831 | 7,671 | 132484 | 116087 | 11.412441 |
| .935 | 216,831 | 5,003 | 131779 | 113419 | 11.618768 |
| .930 | 216,831 | 2,668 | 131074 | 111084 | 11.799557 |
| .925 | 216,831 | 334 | 130370 | 108750 | 11.988000 |
| .920 | 216,831 | 0 | 129665 | 108416 | 0 |
| .915 | 189,727 | 667 | 128960 | 95531 | 0 |
| .910 | 189,727 | 0 | 128255 | 94864 | 0 |
| .905 | 189,727 | 0 | 127550 | 94864 | 0 |
| .900 | 189,727 | 0 | 126846 | 94864 | 0 |
| .890 | 189,727 | 0 | 125437 | 94864 | 0 |
| .880 | 189,727 | 0 | 124027 | 94864 | 0 |
| .870 | 189,727 | 0 | 122618 | 94864 | 0 |
| .860 | 189,727 | 0 | 121208 | 94864 | 0 |
| .850 | 189,727 | 0 | 119799 | 94864 | 0 |
| .840 | 189,727 | 0 | 118390 | 94864 | 0 |
| .830 | 189,727 | 0 | 116980 | 94864 | 0 |
| .820 | 189,727 | 0 | 115571 | 94564 | 0 |
| .810 | 189,727 | 0 | 114161 | 94864 | 0 |
| .800 | 189,727 | 0 | 112752 | 94864 | 0 |
| .750 | 189,727 | 0 | 105705 | 94864 | 0 |
| .700 | 189,727 | 0 | 98658 | 94864 | 0 |
| .650 | 189,727 | 0 | 91611 | 94864 | 0 |
| .600 | 189,727 | 0 | 84564 | 94864 | 0 |
| .550 | 189,727 | 0 | 77517 | 94864 | 0 |
| .500 | 189,727 | 0 | 70470 | 94864 | 0 |

*FIG. 10*

| S | ISL | II |
|---|---|---|
| 1.0 | 99.69 | 1,822,831.41 |
| 2.0 | 99.68 | 1,820,638.31 |
| 3.0 | 99.67 | 1,817,624.77 |
| 4.0 | 99.63 | 1,809,804.25 |
| 5.0 | 99.56 | 1,785,094.12 |
| 6.0 | 99.42 | 1,748,297.86 |
| 7.0 | 99.26 | 1,698,958.37 |
| 8.0 | 99.08 | 1,649,028.77 |
| 9.0 | 98.88 | 1,593,124.98 |
| 10.0 | 98.63 | 1,531,311.75 |
| 11.0 | 98.38 | 1,474,968.65 |
| 12.0 | 98.10 | 1,422,978.86 |
| 13.0 | 97.80 | 1,375,153.35 |
| 14.0 | 97.45 | 1,328,852.01 |
| 15.0 | 97.17 | 1,283,176.63 |
| 16.0 | 96.80 | 1,244,540.99 |
| 17.0 | 96.47 | 1,206,767.38 |
| 18.0 | 96.10 | 1,171,594.32 |
| 19.0 | 95.77 | 1,141,199.23 |
| 20.0 | 95.44 | 1,111,291.65 |
| 21.0 | 95.16 | 1,079,835.60 |
| 22.0 | 94.91 | 1,050,868.25 |
| 23.0 | 94.65 | 1,030,208.07 |
| 24.0 | 94.36 | 1,004,709.19 |
| 25.0 | 94.17 | 985,611.12 |
| 26.0 | 93.95 | 963,636.57 |
| 27.0 | 93.80 | 948,687.63 |
| 28.0 | 93.62 | 928,864.19 |
| 29.0 | 93.18 | 912,251.80 |
| 30.0 | 93.16 | 900,225.03 |

*FIG. 11*

SYSTEM AND METHOD FOR CONTROLLING THE NUMBER OF UNITS OF PARTS IN AN INVENTORY

TECHNICAL FIELD

This invention relates generally to a system and method for controlling an inventory, and more particularly to a system and method for controlling the number of units of parts in an inventory constrained by an inventory investment or an inventory service level constraint.

BACKGROUND OF THE INVENTION

An inventory typically comprises a group of goods, materials and articles known as parts. In operation, an order for one or more units of a part is filled from the inventory. Ideally, the number of units UI of each part in the inventory would be unlimited so every order could be filled from the inventory. However, typically the number of units UI of each part is limited by financial constraints. It is desirable to control the number of units UI of each part so the inventory does not exceed the financial constraints.

These financial constraints limit the number of units of each part in the following manner. Each part in an inventory has a corresponding cost C, the number of units in the inventory UI, and part investment PI. The part investment PI can be calculated as $$PI = (UI)(C) \qquad (1)$$

Since each part has a corresponding part investment PI, an inventory investment II for an inventory having n parts can be calculated as $$II = \sum_{x=1}^{n} PI_x \qquad (2)$$

The inventory investment II of a typical inventory is constrained by a financial constraint referred to as an inventory investment constraint IIC. Thus, $$II \leq IIC \qquad (3)$$

Since the inventory investment constraint IIC constrains the inventory investment II, it also constrains the part investment PI for each part and the number of units UI of each part in the inventory. As a result, only some orders are filled from the inventory at the time of the orders. These orders are referred to as fillable-from-stock orders FFSO.

An example of a typical inventory is illustrated in FIGS. 1A–C. With reference to FIG. 1A, an inventory 20 comprises parts A, B and C. A plurality of orders 22 for parts A, B and C include some fillable-from-stock orders FFSO. With reference to FIG. 1B, parts A, B and C completely fill the orders 22 which are fillable-from-stock FFSO orders and partially fill the remaining orders 22, thereby providing a plurality of order outputs 24.

The number of units UI of each part in an inventory is typically controlled by determining a minimum unit replenishment quantity MURQ and a safety unit quantity SUQ for each part using a typical inventory forecasting program such as GAINS, which is available from BSA Systems. When the number of units UI of a part in the inventory is less than or equal to the safety unit quantity SUQ, then at least the minimum unit replenishment quantity MURQ is ordered to restock the inventory. Thus, for example, in FIG. 1C a plurality of minimum unit replenishment quantities MURQ 26 will restock the number of units UI of parts A, B and C in the inventory.

The quantity ordered Q on any given day may differ from the minimum unit replenishment quantity MURQ depending on which of a variety of restocking techniques is used. Some typical restocking techniques include time-phased order point, material requirements planning, and reorder point. One known reorder point restocking technique is to order the quantity ordered Q when the number of units UI of a part in the inventory is less than or equal to the sum of the safety unit quantity SUQ for the part and a forecast unit demand over lead time FUDLT for the part, where the number of units UI of the part in the inventory may include in-transit units. The forecast unit demand over lead time FUDLT is a forecast of what the unit demand for the part will be before the inventory can be restocked. In this known technique, the quantity ordered Q for the part equals the sum of the safety unit quantity SUQ, the minimum unit replenishment quantity MURQ, and the forecast unit demand over lead time FUDLT for the part minus the number of units UI of the part in the inventory.

An inventory forecasting program such as GAINS uses information such as a monthly unit demand history, receiving or setup cost, inventory carrying cost, lead time, and an expected part service level PSL for each part to determine the minimum unit replenishment quantity MURQ and the safety unit quantity SUQ for each part. The expected part service level PSL for each part is an expected fraction of orders for the part which will be fillable-from-stock orders FFSO, and it can be approximated by an expected fraction of ordered units of the part which will be supplied from the inventory. Thus, $$PSL = \frac{(FFSO)}{(O)} \qquad (4)$$

where O is the number of orders for the part. In general, a higher expected part service level PSL for a part results in a higher minimum unit replenishment quantity MURQ and safety unit quantity SUQ for that part.

Because the minimum unit replenishment quantity MURQ for each part in an inventory increases the number of units UI of the part in the inventory, it also increases the part investment PI for that part, as can be seen from equation (1) above. Since the part investment PI for each part is constrained by the inventory investment constraint IIC, the minimum unit replenishment quantity MURQ and therefore the expected part service level PSL for each part are also constrained by the inventory investment constraint IIC.

Accordingly, known methods are used for selecting which parts will have higher expected part service levels PSL than others. In one known method, parts are grouped according to a subjective evaluation of their importance. Using this method, for example, parts designated X, Y and Z might be evaluated as having high, medium and low importance, respectively. The expected part service level PSL of X parts would then be higher than the expected part service level of Y parts or Z parts. Similarly, the expected part service level PSL of Y parts would be higher than the expected part service level of Z parts.

It is known that these conventional methods are problematic. Orders for some parts tend to be arbitrarily frequent fillable-from-stock orders FFSO, while orders for other parts are arbitrarily infrequent fillable-from-stock orders FFSO. Known methods are also problematic because they are time, labor, and cost-intensive. Therefore, there is a need in the art for an improved system and method for controlling the number of units UI of parts in an inventory which are less arbitrary. There is also a need for an improved system and method which are more efficient with time, labor, and cost.

Advantages and novel features of the invention will be set forth in part in the description which follows, and in part will become apparent to those skilled in the art upon examination of the following or may be learned by practice of the invention. The advantages of the invention may be realized and obtained by means of the instrumentalities and combinations particularly pointed out in the appended claims.

SUMMARY OF THE INVENTION

The present invention provides a computer system and method for controlling the number of units of each of a plurality of different parts in an inventory. In a preferred embodiment, the computer system comprises a memory which stores a part data table for each part, an input device which receives a selected inventory investment constraint, a processor which retrieves the part data table for each part and determines a minimum unit replenishment quantity and a safety unit quantity for each part, and an output device which outputs the minimum unit replenishment quantity and the safety unit quantity for each part. The part data table for each part comprises the number of units of the part in the inventory, a forecast unit demand for the part, the cost of the part, a historical average ratio of units per order for the part, and an average number of units of the part expected to be in the inventory for each of a plurality of expected part service levels for the part. In order to determine the minimum unit replenishment quantity and the safety unit quantity for each part, the processor determines an expected number of fillable-from-stock orders and a slope for each part service level of each part. Each expected number of fillable-from-stock orders for each part is the product of the corresponding expected part service level and the ratio of the forecast unit demand for the part to the historical average ratio of units per order for the part. Each slope for each part is the ratio of the change in the corresponding expected number of fillable-from-stock orders for the part to the change in the ratio of the corresponding average number of units of the part expected to be in the inventory to the historical average ratio of units per order for the part. The processor further determines a slope which is common to each part and for which the sum of the expected part investments for each of the parts is equal to the selected inventory investment constraint. Still further, the processor determines the minimum unit replenishment quantity and the safety unit quantity for each part which can effect the expected part service level for each part corresponding to the determined common slope.

In an alternative embodiment, the input device receives a selected inventory service level constraint and, in order to determine the minimum unit replenishment quantity and the safety unit quantity, the processor also determines an expected number of orders for each part. Each expected number of orders for each part is the ratio of the forecast unit demand for the part to the historical average ratio of units per order for the part. Also, the determined common slope is such that the ratio of the sum of the corresponding expected number of fillable-from-stock orders for all parts to the sum of the expected number of orders for all the parts is equal to the selected inventory service level constraint.

In another alternative embodiment each slope for each part is the ratio of the corresponding expected number of fillable-from-stock orders for the part to the ratio of the corresponding average number of units of the part expected to be in the inventory to the historical average ratio of units per order for the part.

In still another alternative embodiment each slope for each part is the ratio of the change in the expected number of fillable-from-stock orders for the part to the change in the corresponding expected part investment.

The computer system and method of the present invention thus provide an optimized inventory service level for an inventory constrained by an inventory investment constraint. Alternatively, the system and method provide an optimized inventory investment for an inventory constrained by an inventory service level constraint.

BRIEF DESCRIPTION OF THE DRAWINGS

These and other features of the present invention will be better understood with reference to the following description, appended claims, and accompanying drawings where:

FIG. 8 is an output table from the computer system of FIG. 2 illustrating a subset of a slope table.

FIG. 9 is an output table from the computer system of FIG. 2 illustrating the functional relationship between the common slope, the inventory service level and the inventory investment.

FIG. 10 is an output table from a computer system according to another version of the present invention illustrating a subset of a slope table.

FIG. 11 is an output table from the computer system of FIG. 10 illustrating the functional relationship between the common slope, the inventory service level and the inventory investment determined using average analysis.

DETAILED DESCRIPTION OF THE INVENTION

In the following table the acronyms and units associated with frequently used terms in this description are listed for convenience.

TABLE OF TERMS

| | |
|---|---|
| ARUPO | average ratio of units per order for a part |
| AUEI | average number of units of a part expected to be in the inventory (units) |
| C | cost of a part ($) |
| EFFSO | expected number of fillable-from-stock orders (orders) |
| EFFSU | expected number of fillable-from-stock ordered units for a part (units) |
| EO | expected number of orders for a part (orders) |
| EPI | expected part investment for a part ($) |
| FFSO | fillable-from-stock orders for a part (orders) |
| FUD | forecast unit demand for a part (units) |

TABLE OF TERMS-continued

| | |
|---|---|
| II | inventory investment ($) |
| IIC | inventory investment constraint ($) |
| ISL | inventory service level |
| ISLC | inventory service level constraint |
| MURQ | minimum unit replenishment quantity for a part (units) |
| O | number of orders for a part (orders) |
| PI | part investment for a part ($) |
| PSL | part service level for a part |
| Q | quantity ordered for a part (units) |
| S | slope |
| SUQ | safety unit quantity for a part (units) |
| UI | number of units of a part in the inventory (units) |

Figure 1A:
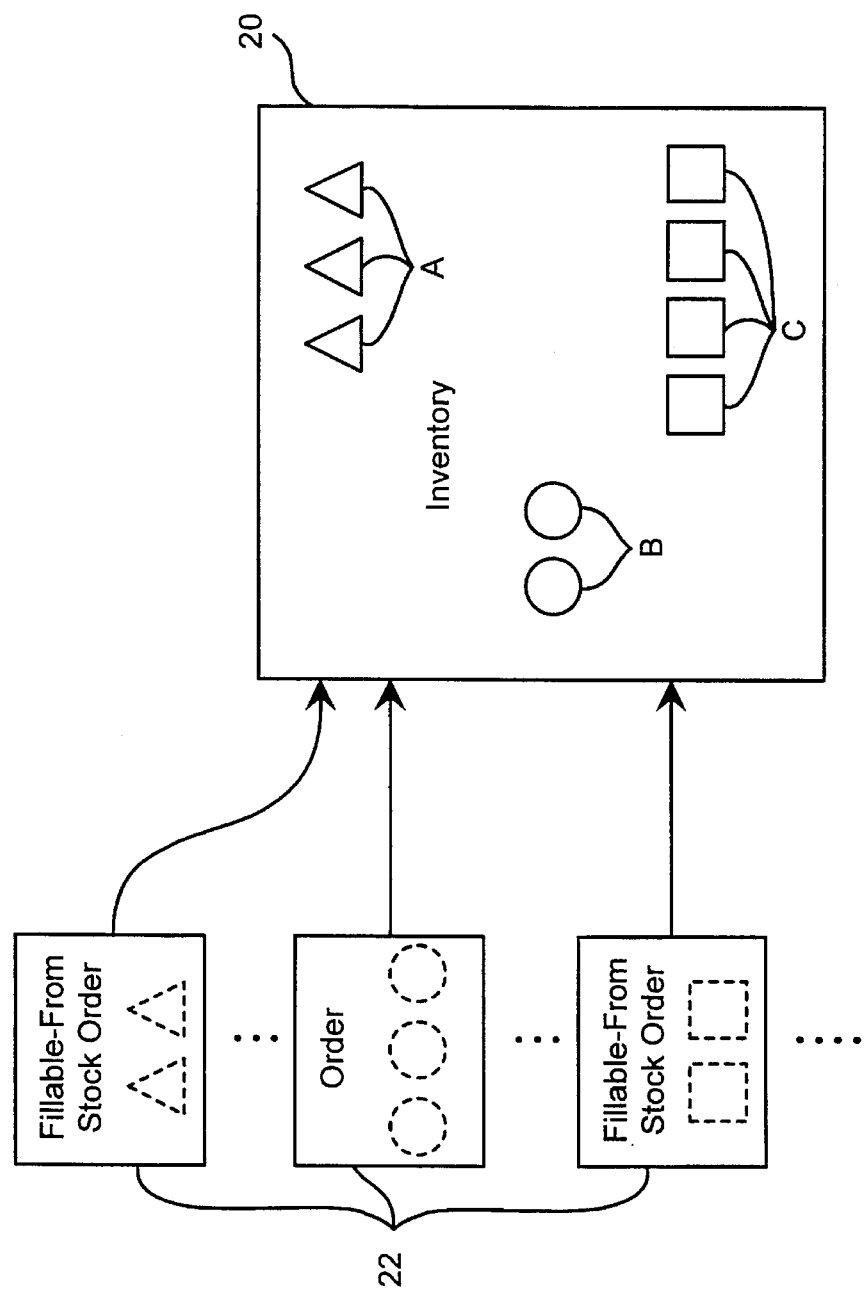
FIGS. 1A, 1B and 1C are schematic drawings of a typical inventory illustrating orders, fillable-from-stock orders and minimum unit replenishment quantities.
Figure 1B:
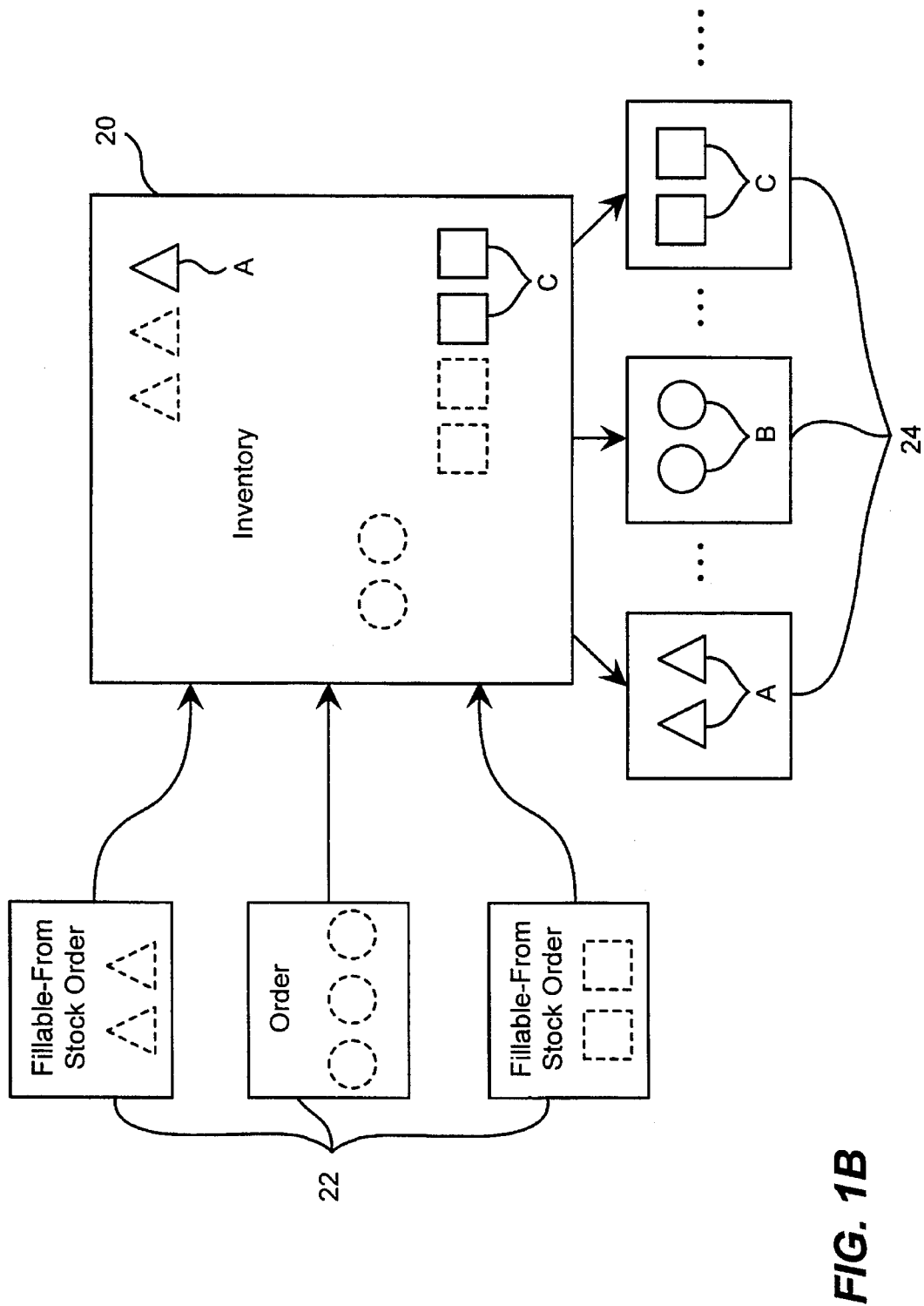
Figure 1C:
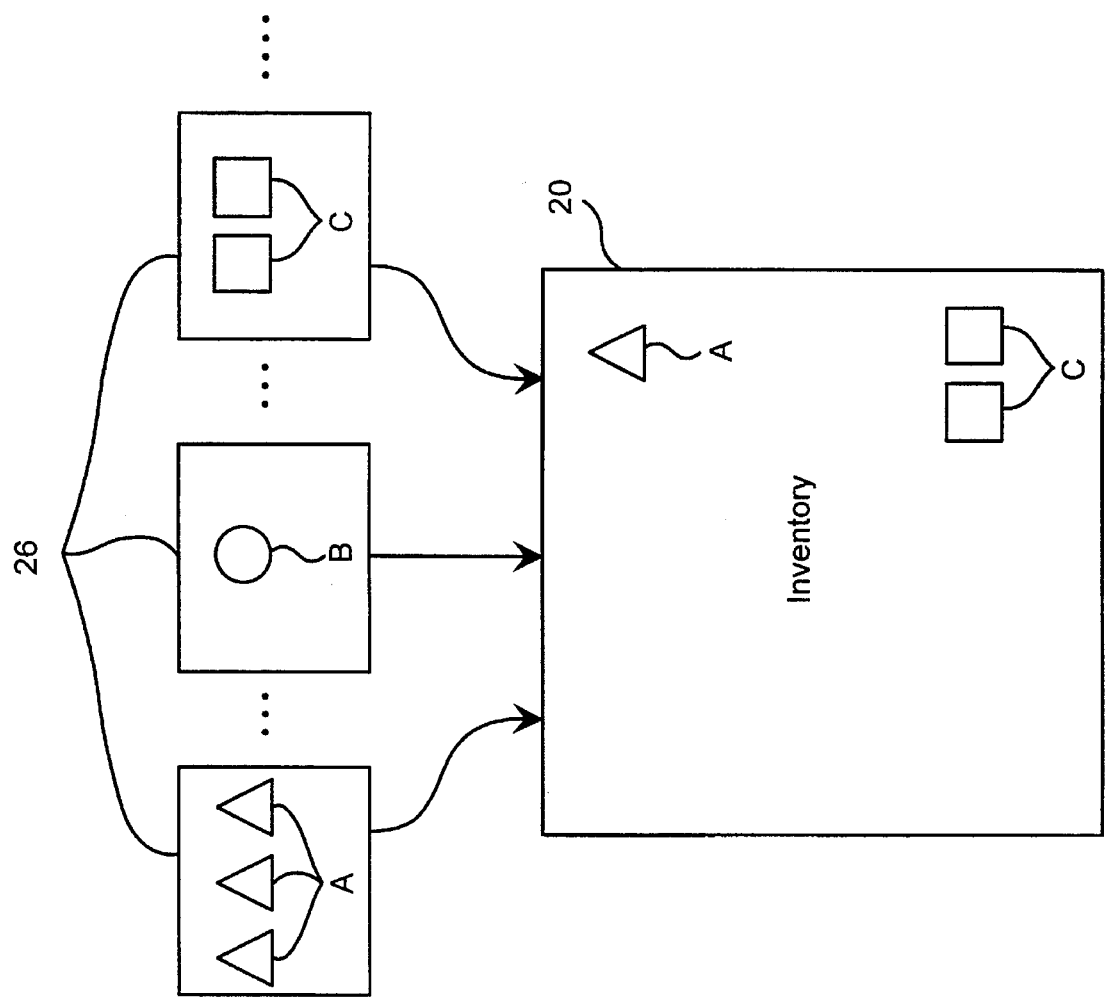
Figure 2:
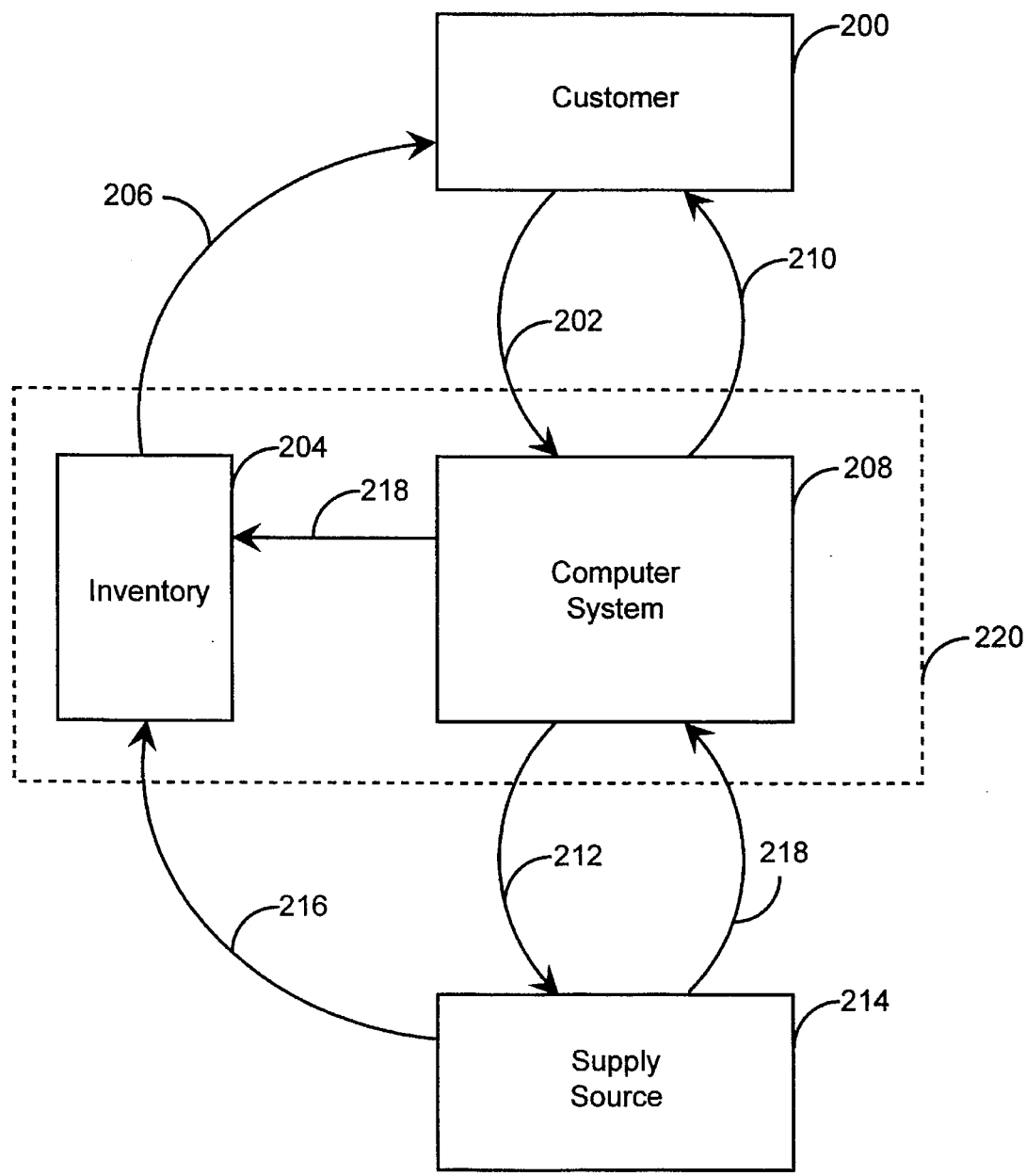
FIG. 2 is a block diagram illustrating a preferred computer system embodiment of the present invention.

In a preferred embodiment the present invention provides a computer system as illustrated in FIG. 2. Although the systems and methods of the present invention will be described with respect to this preferred embodiment, it will be understood that the systems and methods can be implemented in systems of varying architectures, including hard-wired systems and systems having more than one computer located at locations remote from one another.

With reference to FIG. 2, a customer 200 places an order 202 for one or more parts in the inventory 204. In response, the inventory 204 supplies a number of units of parts 206 to fill the order 202 and the computer system 208 issues an invoice 210. Communications 218 between the computer system 208 and the inventory 204 assist this response. In the preferred embodiment of FIG. 2, the order 202 is placed automatically with known methods of electronic transmission. Similarly, the invoice 210 is transmitted automatically using known methods of electronic transmission. By transmitting automatically, the system reduces the necessary time and labor. However, it will be understood that both the order 202 and the invoice 210 can be transmitted using a printout or other communication methods.

Periodically the computer system 208 places orders 212 for at least minimum unit replenishment quantities MURQ of the parts with a supply source 214, which contains a quantity of parts to resupply the inventory 204. In response to the orders 212, the supply source 214 supplies a number of units of the parts 216 to the inventory 204 and issues invoices 218 to the computer system 208. In the preferred embodiment of FIG. 2, the invoices 218 are transmitted using known methods of electronic transmission, although it will be understood that the invoices 218 can be printouts or any other method of transmission.

The computer system 208 and the inventory 204 can be controlled by a single entity, such as by a distributor 220. However, it will be understood that other arrangements are also possible.

Figure 3:
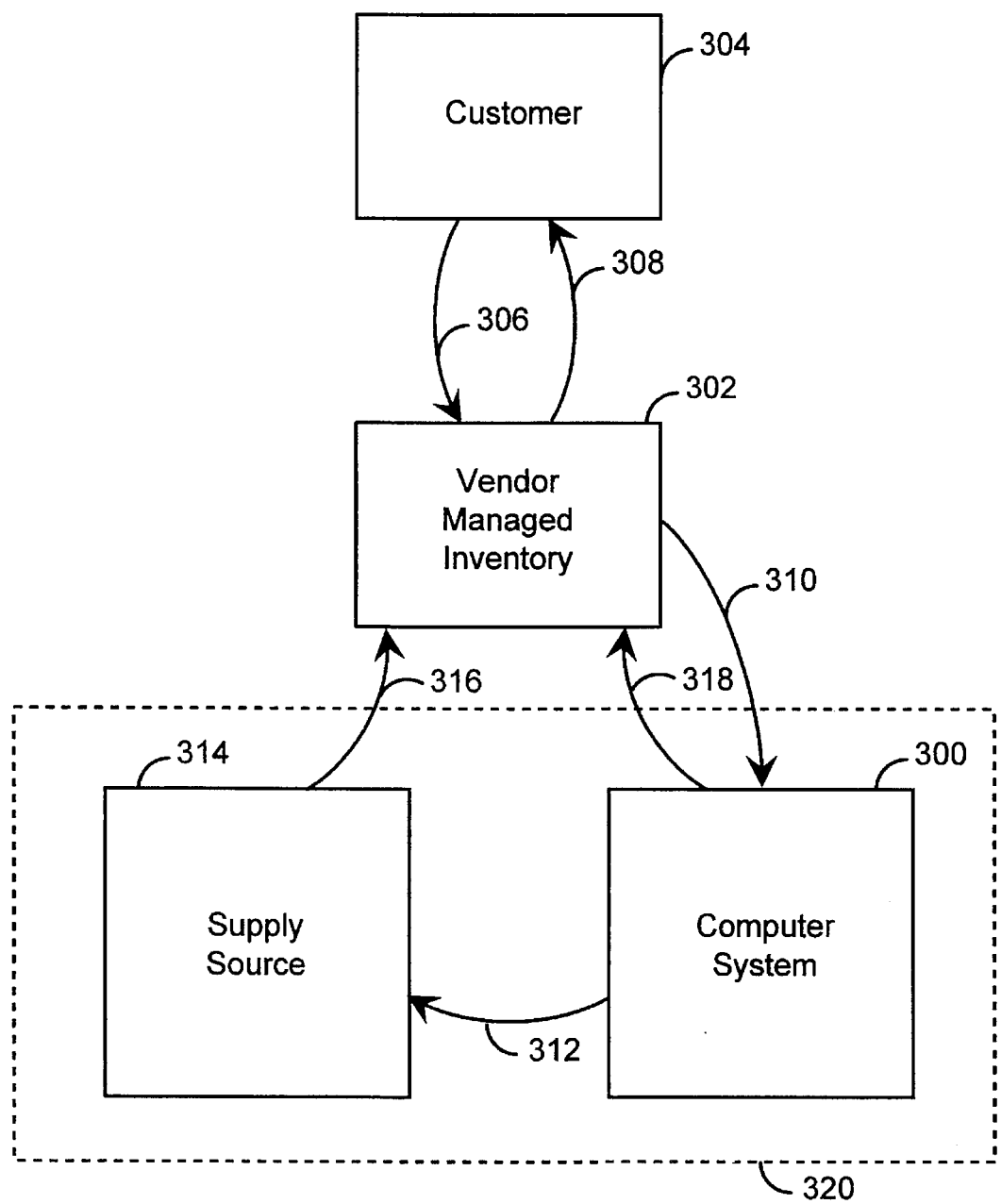
FIG. 3 is a block diagram illustrating an alternative computer system embodiment controlling a vendor-managed inventory.

Another embodiment of the present invention is illustrated in FIG. 3. A computer system 300 is used to control a vendor-managed inventory 302. This type of inventory 302 is managed by the vendor who is the supply source, rather than by the vendor's customer, such as a distributor, who is the owner of the vendor-managed inventory 302 and typically uses the inventory 302 in its own business or to supply its own customers.

In the embodiment of FIG. 3, a customer 304 places an order 306 for one or more parts in the vendor-managed inventory 302. In response, the vendor-managed inventory 302 supplies a number of units of parts 308 to fill the order 306. The computer system 300 retrieves part data 310 from the vendor-managed inventory 302 in a manner which will be explained in more detail later. Using this part data 310, the computer system 300 periodically places orders 312 for at least minimum unit replenishment quantities MURQ of the parts with a supply source 314. In response, the supply source 314 supplies a number of units of the parts 316 to the vendor-managed inventory 302 and the computer system 300 issues invoices 318 to the vendor-managed inventory 302. The orders 306, 312, part data 310, and invoices 318 are preferably transmitted using known electronic transmission methods. However, it will be understood that they could also be transmitted using printouts or other known communication methods.

The computer system 300 and the supply source 314 can both be controlled by a single entity 320. However, it will be understood that other arrangements are also possible.

This vendor-managed inventory system provides a more efficient system by reducing transaction costs and response time between a vendor and its customer. It also allows the vendor to more accurately forecast the orders it will need to fill.

Figure 4:
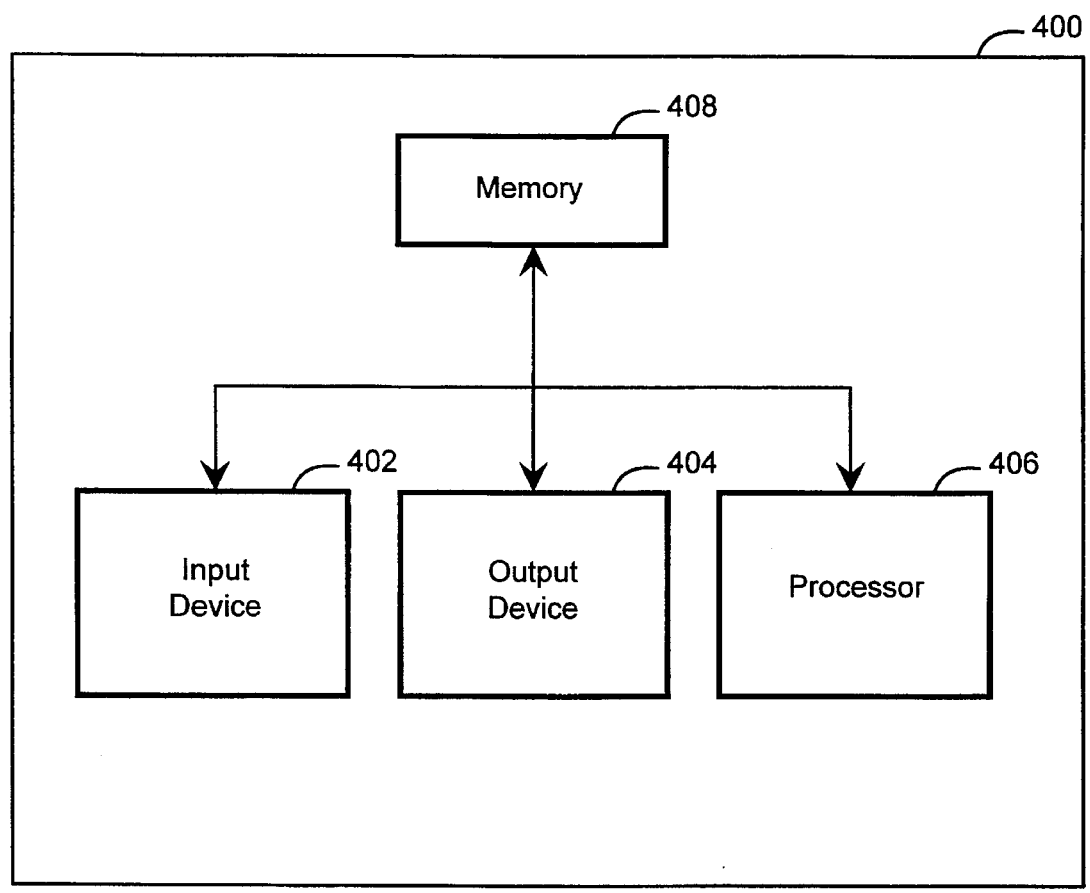
FIG. 4 is a block diagram illustrating the preferred computer system of FIG. 2.
Figure 5:
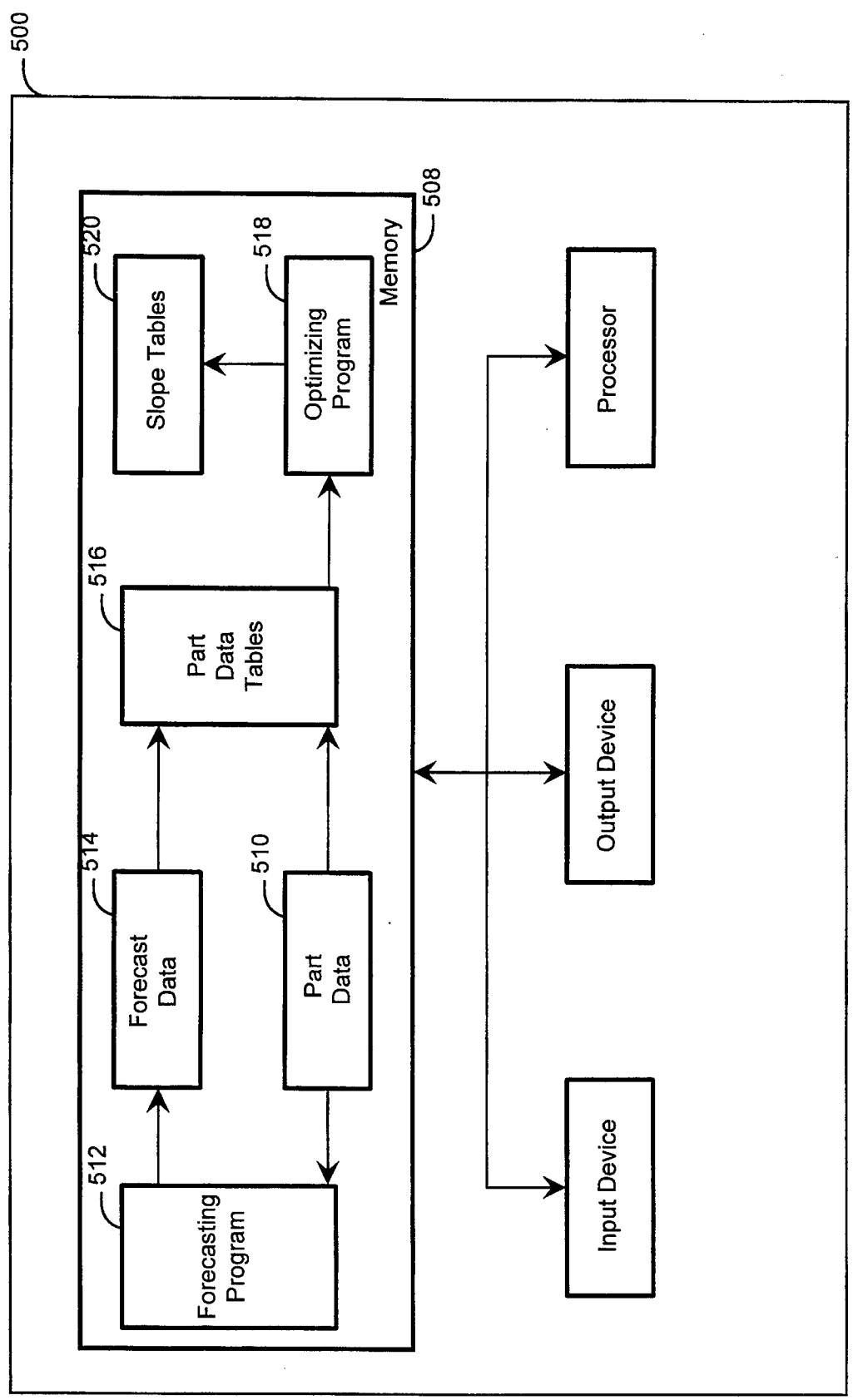
FIG. 5 is a block diagram illustrating the preferred computer system of FIG. 2 in more detail.

As illustrated in FIG. 4, the computer system 400 employed in the preferred embodiments described herein comprises an input device 402, an output device 404, a processor 406, and a memory 408. A more detailed illustration of the preferred computer system is shown in FIG. 5. In the computer system 500, the memory 508 stores part data 510, a forecasting program 512, forecast data 514, part data tables 516, an optimizing program 518, and slope tables 520.

The part data 510 for each part includes the number of units UI of the part in the inventory, the cost C of the part, and a historical average ratio of units per order ARUPO for the part. The cost C of the part is the cost per unit of the part, and the historical average ratio of units per order ARUPO for the part is based on historical information regarding the number of units in a typical order for the part.

The forecasting program 512 uses the stored part data 510 for each part to determine forecast data 514 for each part. The forecasting program 512 is any inventory forecasting program, including typical programs such as GAINS. The stored forecast data 514 for each part includes a forecast unit demand FUD for the part and an average number of units of the part expected to be in the inventory AUEI for each of a plurality of part service levels PSL for the part input into the forecasting program 512. The forecast unit demand FUD for each part is a forecast of the number of units of the part which will be ordered. In a preferred embodiment, the forecast unit demand FUD for the part is normally distributed. Each average number of units of each part expected to be in the inventory AUEI is a forecast of the average number of units of the part needed in inventory to achieve the corresponding part service level PSL for the part. Using GAINS each average number of units of each part expected to be in the inventory AUEI at each part service level PSL for the part is calculated as $$AUEI = SUQ + \tfrac{1}{2}(MURQ) \tag{5}$$

Figure 6:
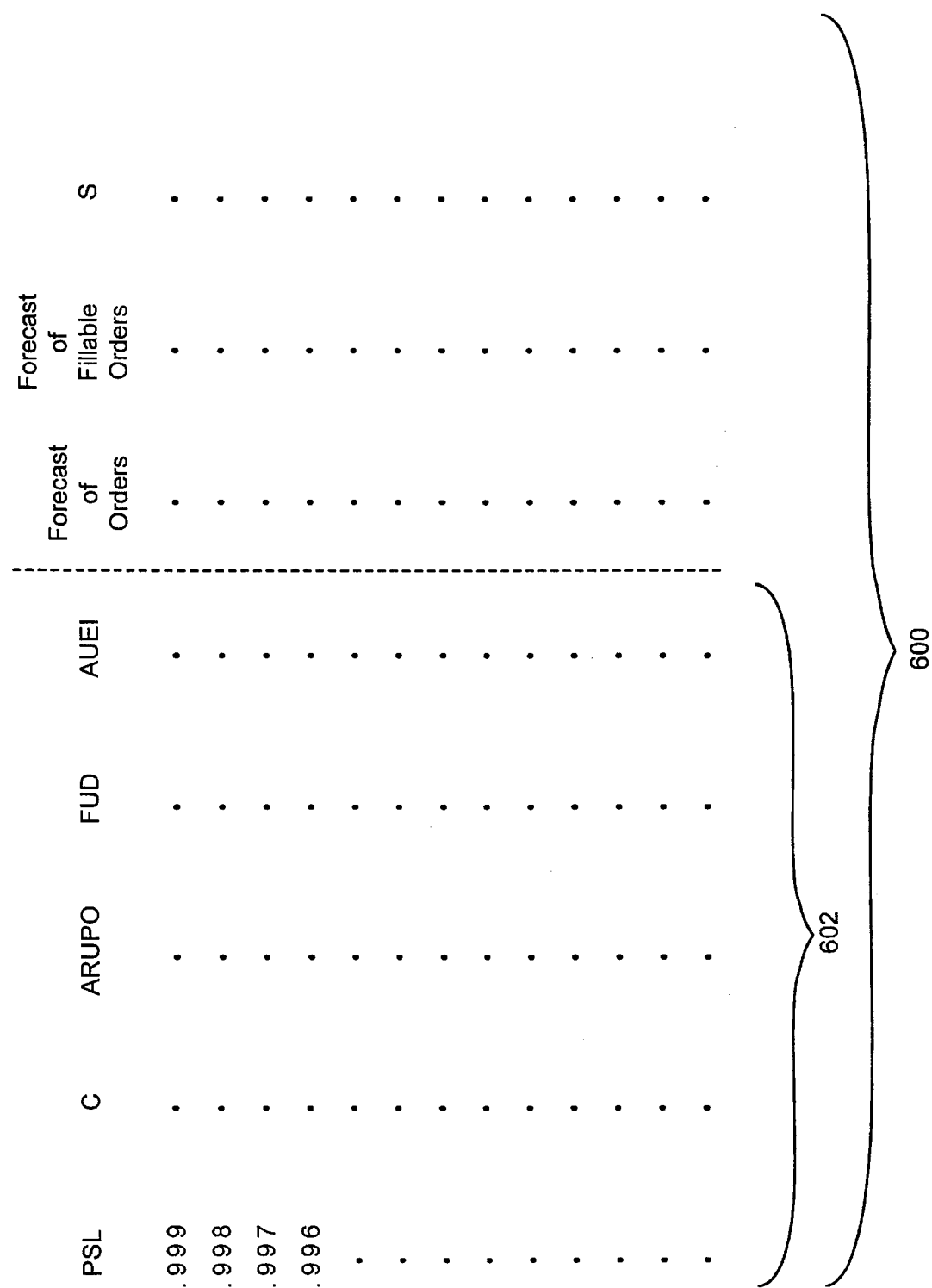
FIG. 6 is a table illustrating a slope table of the preferred embodiment of FIG. 2.

The part data table 516 for each part is a combination of the forecast data 514 and the part data 510 for the part. The part data table 516 for each part is used by the optimizing program 518 to determine a slope table 520 for the part. An example of such a slope table is illustrated in FIG. 6. A slope table 600 for a part includes a part data table 602 for the part. The slope table 600 for the part further includes an expected number of orders EO for the part, an expected number of fillable-from-stock orders EFFSO for the part, and a slope S for the part corresponding to each of the plurality of part service levels PSL. Each expected number of orders EO for each part is the ratio of the forecast unit demand FUD for the part to the historical average ratio of units per order ARUPO for the part. Each expected number of fillable-from-stock orders EFFSO for each part is the product of the corresponding part service level PSL and the ratio of the forecast unit demand FUD for the part to the historical average ratio of units per order ARUPO for the part. The determination of each slope S for each part will be explained later.

Figure 7:
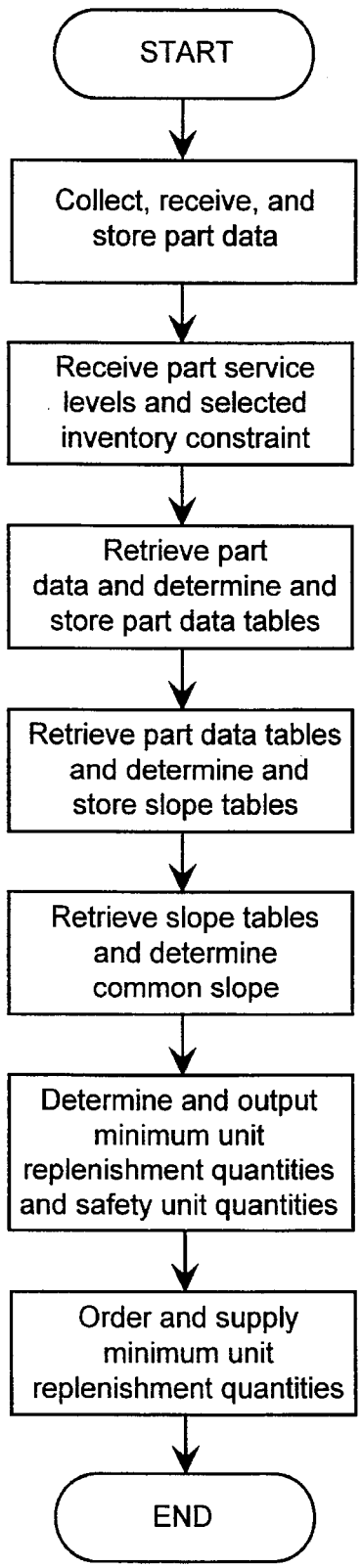
FIG. 7 is a flow diagram illustrating operation of the preferred embodiment of FIG. 2.

The preferred computer system's operation is illustrated in FIG. 7. The system collects the part data for each part in the inventory. In a preferred embodiment, the part data for each part is collected automatically using known electronic inventory and order monitoring methods. However, it will be understood that the part data can be collected manually as well. The system also receives the part data for each part and stores the part data in its memory.

The system also receives a plurality of part service levels PSL for each part and a selected inventory constraint. In a preferred embodiment the plurality of part service levels PSL for each part are automatically entered into an inventory forecasting program such as GAINS. Likewise, in a preferred embodiment, the selected inventory constraint is a predetermined value. However, it will be understood that both the plurality of part service levels PSL for each part and the selected inventory constraint can be entered manually using the input device of the computer system. In one version of the system, the selected inventory constraint is an inventory investment constraint IIC. In another version, the selected inventory constraint is an inventory service level constraint ISLC. An inventory service level ISL for an inventory having n parts is calculated as $$ISL = \frac{\left(\sum_{x=1}^{n} EFFSO_x\right)}{\left(\sum_{x=1}^{n} EO_x\right)} \quad (6)$$

and an inventory service level constraint ISLC constrains the inventory as follows:

$$ISL \leq ISLC \quad (7)$$

The system further retrieves the part data for each part and determines and stores a part data table for each part. The system also retrieves the part data tables and determines and stores a slope table for each part.

As discussed above, the slope table for each part includes a slope S for each of the plurality of part service levels PSL for the part. In one version of the computer system using marginal analysis the slopes S are determined as $$S = \frac{(\Delta EFFSO)}{\left(\Delta \frac{AUEI}{ARUPO}\right)} \quad (8)$$

Marginal analysis will be explained in more detail later. In another version using average analysis, the slopes S are determined as $$S = \frac{(EFFSO)}{\left(\frac{AUEI}{ARUPO}\right)} \quad (9)$$

Average analysis will also be explained in more detail later. In still another version also using marginal analysis, the slopes S are determined as:

$$S = \frac{(\Delta EFFSO)}{(\Delta EPI)} \quad (10)$$

where EPI is an expected part investment corresponding to each of the plurality of part service levels PSL for each part and is calculated as:

$$EPI = (AUEI)(C) \quad (11)$$

In this version, the analysis is biased toward parts with low associated costs C, and thereby provides a lower inventory investment II, higher part service levels PSL, and a higher inventory service level ISL. In a further version also using marginal analysis, the slopes S are determined as:

$$S = \frac{(\Delta EFFSU)}{(\Delta AUEI)} \quad (12)$$

where EFFSU is an expected number of fillable-from-stock ordered units and is calculated as $$EFFSU = (PSL)(FUD) \quad (13)$$

The slopes S could be calculated using any combination of equations (8), (9), (10) and (12), as described above. Such a combination would allow some of the advantages associated with each individual method of calculating the slopes S to be combined. For example, the marginal analysis methods described with respect to equations (8) and (10) could be combined. In one version of this example, the slopes S would be a weighted average of the slopes S calculated according to equations (8) and (10). Thus, $$S = W \left[ \frac{(\Delta EFFSO)}{(\Delta EPI)} \right] + (1 - W) \left[ \frac{(\Delta EESO)}{\Delta \frac{AUEI}{ARUPO}} \right] \quad (14)$$

where W is a weighting factor.

In a preferred version of this example, the slopes S would be a weighted average of normalized slopes S calculated according to equations (8) and (10). Thus, $$S = \frac{(W)}{(N_1)} \left[ \frac{(\Delta EFFSO)}{(\Delta EPI)} \right] + \frac{(1 - W)}{(N_2)} \left[ \frac{(\Delta EFFSO)}{\Delta \frac{AUEI}{ARUPO}} \right] \quad (15)$$

where $N_1$ and $N_2$ are normalizing factors calculated, for example, as $$N_1 = \sum_{x=1}^{n} (C_x)(FUD_x) \quad (16)$$

$$N_2 = \sum_{x=1}^{n} \frac{(FUD_x)}{(ARUPO_x)} \quad (17)$$

where n is the number of parts in the inventory. Of course, $N_1$ and $N_2$ could be calculated using other methods to obtain normalizing factors.

The system further retrieves each slope table for each part and optimizes the number of units UI of each part in the inventory for the selected inventory constraint by determining a common slope S. Specifically, in one version, the system determines a slope S which is common to each slope table and for which the sum of expected part investments EPI for each part corresponding to the common slope S is equal to a selected inventory investment constraint IIC. Alternatively, the system determines a slope S which is common to each slope table and for which the ratio of the sum of the corresponding expected number of fillable-from-stock orders EFFSO for all the parts to the sum of the expected number of orders EO for all the parts is equal to a selected inventory service level constraint ISLC.

The system further determines a minimum unit replenishment quantity MURQ and a safety unit quantity SUQ for each part capable of effecting the part service level PSL for each part corresponding to the determined common slope S. The system further outputs the minimum unit replenishment quantity MURQ and the safety unit quantity SUQ for each part and supplies at least a number of units of each part equal to the minimum unit replenishment quantities MURQ for the parts from a supply source to the inventory when the number of units UI of a part in the inventory is less than or equal to the safety unit quantity SUQ.

FIG. 8 illustrates a typical output for a part from the computer system of FIG. 2. In this illustrated example, the historical average ratio of units per order ARUPO is 10. The first column 800 illustrates a range of part service levels PSL for the part. The second column 808 illustrates a range of minimum unit replenishment quantities MURQ for the part. The third column 810 illustrates a range of safety unit quantities SUQ for the part. The fourth column 802 illustrates the corresponding expected number of fillable-from-stock orders EFFSO, while the fifth column 804 illustrates the average number of units of the part expected to be in the inventory AUEI corresponding to each of the part service levels PSL in the first column 800. Finally, the sixth column 806 illustrates the slopes S corresponding to the expected number of fillable-from-stock orders EFFSO in the fourth column 802. The slopes S are calculated in accordance with equation (8) as described above.

FIG. 9 illustrates a typical output for all the parts from the computer system of FIG. 2. The first column 900 is the common slope S, while the second column 902 is the inventory service level ISL. Also, the third column 904 is the inventory investment II. If, for example, the inventory investment constraint IIC was $1,000,000, then the common slope S would be determined by the system to be 2.5.

FIG. 10 illustrates a typical output for a part from an alternate computer system using average analysis as discussed with respect to equation (9). In this illustrated example, the historical average ratio of units per order ARUPO is 10. The present invention recognizes that in operation the accuracy of the inventory forecasting program may be less than desirable. In particular, when the orders which the inventory fills are subject to large and unpredictable changes, or the actual unit demand is low so the forecast unit demand FUD has a low data stability, then an average analysis can sometimes provide better minimum unit replenishment quantities MURQ and safety unit quantities SUQ than a marginal analysis such as that used by the preferred computer system of FIG. 2. The first column 1000 of FIG. 10 illustrates a range of part service levels PSL for the part. The second column 1002 illustrates a range of minimum unit replenishment quantities MURQ for the part. The third column 1004 illustrates a range of safety unit quantities SUQ for the part. The fourth column 1006 illustrates the corresponding expected number of fillable-from-stock orders EFFSO, while the fifth column 1008 illustrates the average number of units of the part expected to be in the inventory AUEI corresponding to each of the part service levels PSL in the first column 1000. Finally, the sixth column 1010 illustrates the slopes S corresponding to the expected number of fillable-from-stock orders EFFSO in the fourth column 1006.

FIG. 11 illustrates a typical output for all the parts from the alternate computer system of FIG. 10. The first column 1100 is the common slope S, while the second column 1104 is the inventory service level ISL. Also, the third column 1104 is the inventory investment II. If, for example, the inventory investment constraint IIC was $1,000,000, then the common slope S would be determined by the system to be 25.0.

The theory of operation of the present invention will now be explained. The present invention recognizes that conventional methods for controlling the number of units UI of parts in an inventory are problematic because they arbitrarily allocate the minimum unit replenishment quantities MURQ which can be purchased with an inventory investment II among the parts. Because of this mis-allocation, the conventional methods do not optimize the number of units UI of parts in an inventory for a selected constraint on the inventory.

In contrast, in a preferred embodiment the present invention provides a system and method for controlling the number of units UI of each of a plurality of different parts in an inventory by optimizing the number of units UI of each part in the inventory for a selected constraint on the inventory. In a typical inventory, the selected constraint can be the inventory investment constraint IIC. The constraint can also be an inventory service level constraint ISLC.

In a multi-part inventory, the system and method allocate the inventory investment II among the parts. In such a multi-part inventory, the system and method optimize the number of units UI of each part in the inventory for an inventory investment constraint IIC by allocating the inventory investment II among all the parts so as to maximize the inventory service level ISL.

The present invention recognizes a functional relationship between the expected number of fillable-from-stock orders EFFSO and the ratio of the average number of units of each part expected to be in the inventory AUEI to the corresponding historical average ratio of units per order ARUPO for each part. Thus, for each part $$EFFSO = f(AUEI) \qquad (18)$$

Using one version of marginal analysis, the system determines for each part the change in the expected number of fillable-from-stock orders EFFSO with respect to the change in the ratio described with respect to equation (18) above. This is referred to as a slope S, and is defined for each part as $$S = f'(AUEI) \qquad (19)$$

Thus, for example, a part A may have a slope $S_A$ and a part B may have a different slope $S_B$. Increasing the average number of units of part A expected to be in the inventory AUEI such that one more average order for part A can be filled will cause an increase in the expected number of fillable-from-stock orders EFFSO for part A equal to the slope $S_A$. Similarly, increasing the average number of units of part B expected to be in the inventory AUEI such that one more average order for part B can be filled will cause an increase in the expected number of fillable-from-stock orders EFFSO for part B equal to the slope $S_B$. Because the slopes S for parts A and B are different, one of the corresponding increases in the expected number of fillable-from-stock orders EFFSO for parts A and B will be greater than the other.

Therefore, the inventory service level ISL can be increased by allocating the inventory investment II to purchase a minimum unit replenishment quantity MURQ for the parts having the greatest slopes S. However, the nature of the functional relationship between the expected number of fillable-from-stock orders EFFSO and the average number of units of the part expected to be in the inventory AUEI is such that the slope S generally decreases as the average number of units of the part expected to be in the inventory AUEI increases. Thus, allocating the inventory investment II to purchase a minimum unit replenishment quantity MURQ for the parts having the greatest slopes S will generally decrease the slopes S for those parts. Thus, this strategy meets with diminishing returns.

Instead, the system recognizes that the inventory investment II should be allocated to purchase a minimum unit replenishment quantity MURQ for the parts having the greatest slopes S only as long as those parts have the greatest slopes S. Once the slopes S of all the parts in an inventory are equal, then the inventory investment II should be allocated among all the parts so their slopes S remain equal. The inventory investment II should be allocated in this manner until it equals the inventory investment constraint IIC. When this occurs, each part in the inventory will have a common slope S.

Figure 12:
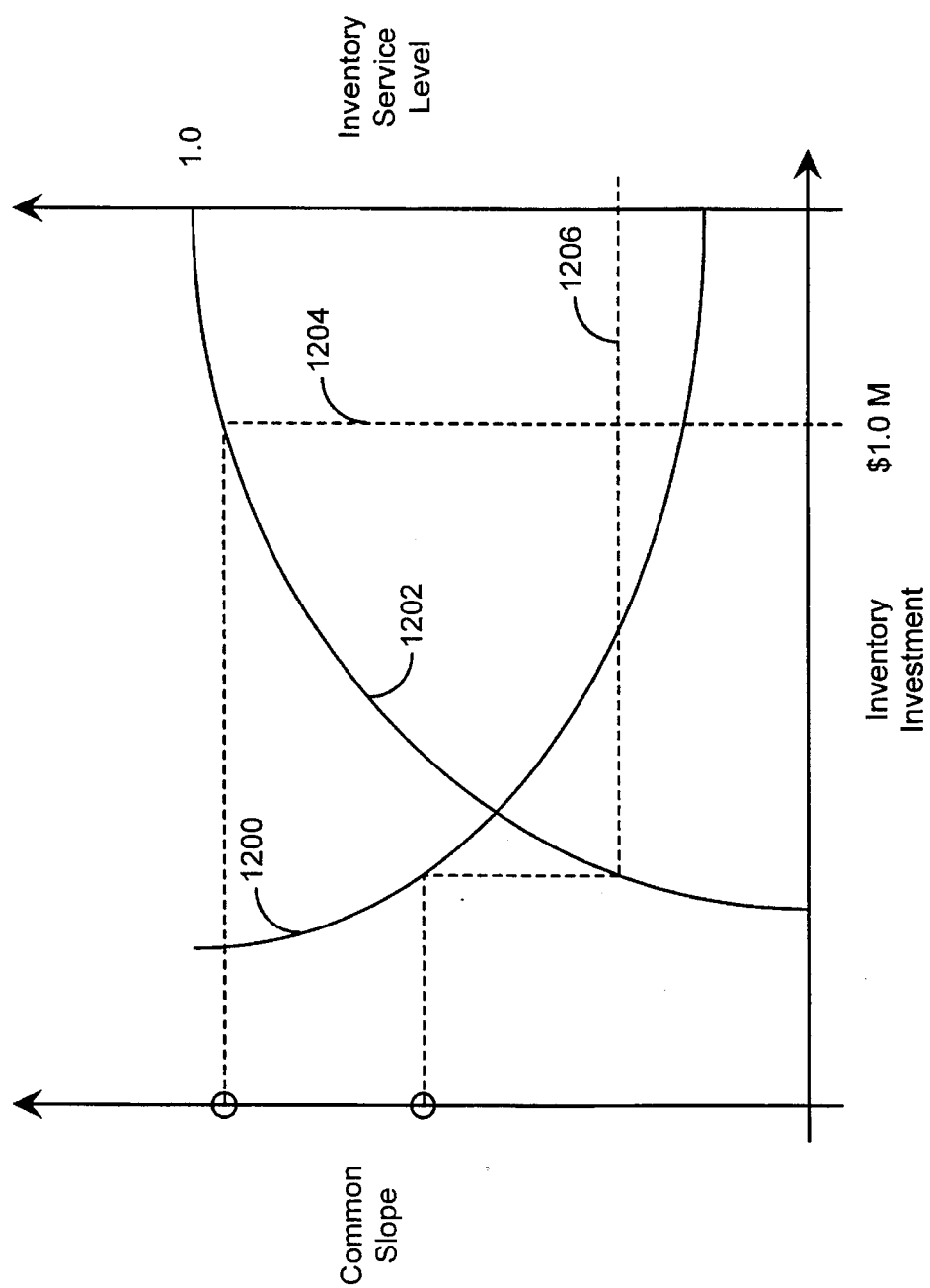
FIG. 12 is a graph illustrating the functional relationship between the common slope, the inventory service level, and the inventory investment of the present invention.

FIG. 12 illustrates the relationship 1200 between the common slope S and the inventory investment II, and the relationship 1202 between the inventory service level ISL and the inventory investment II. The inventory investment II increases until it equals the inventory investment constraint IIC 1204. As the inventory investment II increases, the common slope S generally decreases, and the corresponding inventory service level ISL generally increases. The inventory service level ISL can be limited by an inventory service level constraint ISLC 1206.

The described invention has many advantages. It provides optimized minimum unit replenishment quantities MURQ for a plurality of parts in an inventory having an inventory investment constraint IIC. In an alternative version, it provides optimized minimum unit replenishment quantities MURQ in an inventory having an inventory service level constraint ISLC. Both versions overcome the prior problem of mis-allocations of the inventory investment II. It also provides an automatic system which is more efficient with time and labor, and a vendor-managed system which reduces transaction costs.

Although the present invention has been described with reference to preferred embodiments, the invention is not limited to these preferred embodiments. Rather, the invention is limited only by the appended claims, which include within their scope all equivalent systems or methods which operate according to the principles of the invention as described.

We claim:

1. A computer system for automatically controlling the number of units of each of a plurality of different parts in an inventory having a predetermined inventory investment constraint, the computer system comprising:

means for receiving part data for each part in the inventory, the part data for each part including the number of units of the part in the inventory, the cost of the part, and a historical average ratio of units per order for the part, each order being for at least one unit of the part;

means for storing the part data for each part;

means for inputting a plurality of part service levels for each part, each part service level for each part representing an expected fraction of the orders for the part which can be filled from the inventory;

means for retrieving the part data for each part and for determining a part data table for each part which relates forecast data for the part to the part data for the part and the plurality of part service levels for the part, the forecast data for each part including a forecast unit demand for the part and an average number of units of the part for each of the plurality of part service levels for the part;

means for storing the part data table for each part;

means for retrieving the part data table for each part and for determining a slope table for each part which relates each of the plurality of part service levels for the part to an expected number of fillable-from-stock orders for the part and a slope for the part, each expected number of fillable-from-stock orders for the part being the product of the corresponding part service level and the ratio of the forecast unit demand for the part to the historical average ratio of units per order for the part, each slope for the part being the ratio of the change in the corresponding expected number of fillable-from-stock orders for the part to the change in the ratio of the corresponding average number of units of the part expected to be in the inventory to the historical average ratio of units per order for the part;

means for storing the slope table for each part;

means for retrieving the slope tables for all the parts and for determining a slope which is common to each slope table and for which the sum of expected part investments for each part corresponding to the slope is equal to the inventory investment constraint, each expected part investment being the product of the corresponding average number of units of the part expected to be in the inventory and the cost of the part;

means for determining a minimum unit replenishment quantity and a safety unit quantity for each part capable of effecting the part service level for the part corresponding to the determined common slope;

means for outputting the minimum unit replenishment quantity and the safety unit quantity for each part; and means for ordering the minimum unit replenishment quantity for at least one of the parts from a supply source when the number of units of the part in the inventory is less than or equal to the safety unit quantity.

2. A computer system for controlling the number of units of each of a plurality of different parts in an inventory, the computer system comprising:

a memory configured to store a part data table for each part, wherein the part data table for each part relates part data for the part to forecast data for the part, the part data for each part including the number of units of the part in the inventory, the cost of the part, and a historical average ratio of units per order for the part, the forecast data for each part including a forecast unit demand for the part and an average number of units of the part expected to be in the inventory for each of a plurality of part service levels for the part, each part service level for each part representing an expected fraction of the orders for the part which can be filled from the inventory;

an input device for receiving a selected inventory investment constraint;

a processor operatively coupled to the memory and the input device, the processor configured to:

retrieve the part data table for each part, determine a slope table for each part which relates each of the plurality of part service levels for the part to an expected number of fillable-from-stock orders for the part and a slope for the part, each expected number of fillable-from-stock orders for the part being the product of the corresponding part service level and the ratio of the forecast unit demand for the part to the historical average ratio of units per order for the part, each slope for the part being the ratio of the change in the corresponding expected number of fillable-from-stock orders for the part to the change in the ratio of the corresponding average number of units of the part expected to be in the inventory to the historical average ratio of units per order for the part, store the slope table for each part in the memory, retrieve the slope tables for all the parts, determine a slope which is common to each slope table and for which the sum of expected part investments for each part corresponding to the slope is equal to the selected inventory investment constraint, each expected part investment being the product of the corresponding average number of units of the part expected to be in the inventory and the cost of the part, and determine a minimum unit replenishment quantity and a safety unit quantity for each part capable of effecting the part service level for the part corresponding to the determined common slope; and an output device operatively coupled to the memory and the processor, the output device configured for outputting the minimum unit replenishment quantity and the safety unit quantity for each part.

3. The computer system of claim 2 wherein the forecast unit demand for each part is normally distributed.

4. A computer system for controlling the number of units of each of a plurality of different parts in an inventory, the computer system comprising:

a memory configured to store a part data table for each part, wherein the part data table for each part relates part data for the part to forecast data for the part, the part data for each part including the number of units of the part in the inventory and a historical average ratio of units per order for the part, each order being for at least one unit of the part, the forecast data for each part including a forecast unit demand for the part and an average number of units of the part expected to be in the inventory for each of a plurality of part service levels for the part, each part service level for each part representing an expected fraction of the orders for the part which can be filled from the inventory;

an input device for receiving a selected inventory service level constraint;

a processor operatively coupled to the memory and the input device, the processor configured to:

retrieve the part data table for each part, determine a slope table for each part which relates each of the plurality of part service levels for the part to an expected number of orders for the part, an expected number of fillable-from-stock orders for the part, and a slope for the part, each expected number of orders for the part being the ratio of the forecast unit demand to the historical average ratio of units per order for the part, each expected number of fillable-from-stock orders for the part being the product of the corresponding part service level and the corresponding expected number of orders for the part, each slope for the part being the ratio of the change in the corresponding expected number of fillable-from-stock orders for the part to the change in the ratio of the corresponding average number of units of the part expected to be in the inventory to the historical average ratio of units per order for the part, store the slope table for each part in the memory, retrieve the slope tables for all the parts, determine a slope which is common to each slope table and for which the ratio of the sum of the corresponding expected number of fillable-from-stock orders for all the parts to the sum of the expected number of orders for all the parts is equal to the selected inventory service level constraint, and determine a minimum unit replenishment quantity and a safety unit quantity for each part capable of effecting the part service level for the part corresponding to the determined common slope; and an output device operatively coupled to the memory and the processor, the output device configured for outputting the minimum unit replenishment quantity and the safety unit quantity for each part.

5. The computer system of claim 4 wherein the forecast unit demand for each part is normally distributed.

6. A computer system for controlling the number of units of each of a plurality of different parts in an inventory, the computer system comprising:

a memory configured to store a part data table for each part, wherein the part data table for each part relates part data for the part to forecast data for the part, the part data for each part including the number of units of the part in the inventory, the cost of the part, and a historical average ratio of units per order for the part, each order being for at least one unit of the part, the forecast data for each part including a forecast unit demand for the part and an average number of units of the part expected to be in the inventory for each of a plurality of part service levels for the part, each part service level for each part representing an expected fraction of the orders for the part which can be filled from the inventory;

an input device for receiving a selected inventory investment constraint;

a processor operatively coupled to the memory and the input device, the processor configured to:

retrieve the part data table for each part, determine a slope table for each part which relates each of the plurality of part service levels for the part to an expected number of fillable-from-stock orders for the part and a slope for the part, each expected number of fillable-from-stock orders for the part being the product of the corresponding part service level and the ratio of the forecast unit demand for the part to the historical average ratio of units per order for the part, each slope for the part being the ratio of the corresponding expected number of fillable-from-stock orders for the part to the ratio of the corresponding average number of units of the part expected to be in the inventory to the historical average ratio of units per order for the part, store the slope table for each part in the memory, retrieve the slope tables for all the parts, determine a slope which is common to each slope table and for which the sum of expected part investments for each part corresponding to the slope is equal to the selected inventory investment constraint, each expected part investment being the product of the corresponding average number of units of the part expected to be in the inventory and the cost of the part, and determine a minimum unit replenishment quantity and a safety unit quantity for each part capable of effecting the part service level for the part corresponding to the determined common slope; and an output device operatively coupled to the memory and the processor, the output device configured for outputting the minimum unit replenishment quantity and the safety unit quantity for each part.

7. A method implemented on a computer system for controlling the number of units of each of a plurality of different parts in a vendor-managed inventory, the computer system comprising a memory, an input device, an output device, and a processor operatively coupled to the memory, the input device, and the output device, the method comprising:

collecting part data for each part in the inventory, the part data for each part including the number of units of the part in the inventory, the cost of the part, and a historical average ratio of units per order for the part, each order being for at least one unit of the part;

receiving and storing the part data for each part;

receiving a plurality of part service levels for each part and a selected inventory investment constraint, each part service level for each part representing an expected fraction of the orders for the part which can be filled from the inventory;

retrieving the part data for each part and determining a part data table for each part which relates forecast data for the part to the part data for the part and the plurality of part service levels for the part, the forecast data for each part including a forecast unit demand for the part and an average number of units of the part expected to be in the inventory for each of the plurality of part service levels for the part;

storing the part data table for each part;

retrieving the part data table for each part and determining a slope table for each part which relates each of the plurality of part service levels for the part to an expected number of fillable-from-stock orders for the part and a slope for the part, each expected number of fillable-from-stock orders for the part being the product of the corresponding part service level and the ratio of the forecast unit demand for the part to the historical average ratio of units per order for the part, each slope for the part being the ratio of the change in the corresponding expected number of fillable-from-stock orders for the part to the change in the ratio of the corresponding average number of units of the part expected to be in the inventory to the historical average ratio of units per order for the part;

storing the slope table for each part;

retrieving the slope tables for all the parts and determining a slope which is common to each slope table and for which the sum of expected part investments for each part corresponding to the slope is equal to the selected inventory investment constraint, each expected part investment being the product of the corresponding average number of units of the part expected to be in the inventory and the cost of the part;

determining a minimum unit replenishment quantity and a safety unit quantity for each part capable of effecting the part service level for the part corresponding to the determined common slope;

outputting the minimum unit replenishment quantity and the safety unit quantity for each part; and when the number of units of a part in the vendor-managed inventory is less than or equal to the safety unit quantity, supplying at least a number of units of the part equal to the minimum unit replenishment quantity for the part from a supply source to the vendor-managed inventory.

8. The method of claim 7 wherein the forecast unit demand for each part is normally distributed.

9. A method implemented on a computer system for controlling the number of units of each of a plurality of different parts in an inventory, the computer system comprising a memory, an input device, an output device, and a processor operatively coupled to the memory, the input device, and the output device, the method comprising:

receiving a selected inventory service level constraint;

receiving and storing a part data table for each part, wherein each part data table relates part data for the part to forecast data for the part, the part data for each part including the number of units of the part in the inventory and a historical average ratio of units per order for the part, each order being for at least one unit of the part, the forecast data for each part including a forecast unit demand for the part and an average number of units of the part expected to be in the inventory for each of a plurality of part service levels for the part, each part service level for each part representing an expected fraction of the orders for the part which can be filled from the inventory;

retrieving the part data table for each part and determining a slope table for each part which relates each of the plurality of part service levels for the part to an expected number of orders for the part, an expected number of fillable-from-stock orders for the part, and a slope for the part, each expected number of orders for the part being the ratio of the forecast unit demand for the part to the historical average ratio of units per order for the part, each expected number of fillable-from-stock orders for the part being the product of the corresponding part service level and the expected number of orders for the part, each slope for the part being the ratio of the change in the corresponding expected number of fillable-from-stock orders for the part to the change in the ratio of the corresponding average number of units of the part expected to be in the inventory to the historical average ratio of units per order for the part;

storing the slope table for each part;

retrieving the slope tables for all the parts and determining a slope which is common to each slope table and for which the ratio of the sum of the corresponding expected number of fillable-from-stock orders for all the parts to the sum of the expected number of orders for all the parts is equal to the selected inventory service level constraint;

determining a minimum unit replenishment quantity and a safety unit quantity for each part capable of effecting the part service level for the part corresponding to the determined common slope; and outputting the minimum unit replenishment quantity and the safety unit quantity for each part.

10. The method of claim 9 wherein the forecast unit demand for each part is normally distributed.

11. A method implemented on a computer system for controlling the number of units of each of a plurality of different parts in an inventory, the computer system comprising a memory, an input device, an output device, and a processor operatively coupled to the memory, the input device, and the output device, the method comprising:

receiving a selected inventory investment constraint;

receiving and storing a part data table for each part, wherein each part data table relates part data for the part to forecast data for the part, the part data for each part including the number of units of the part in the inventory, the cost of the part, and a historical average ratio of units per order for the part, each order being for at least one unit of the part, the forecast data for each part including a forecast unit demand for the part and an average number of units of the part expected to be in the inventory for each of a plurality of part service levels for the part, each part service level for each part representing an expected fraction of the orders for the part which can be filled from the inventory;

retrieving the part data table for each part and determining a slope table for each part which relates each of the plurality of part service levels for the part to an expected number of fillable-from-stock orders for the part and a slope for the part, each expected number of fillable-from-stock orders for the part being the product of the corresponding part service level and the ratio of the forecast unit demand for the part to the historical average ratio of units per order for the part, each slope for the part being the ratio of the corresponding expected number of fillable-from-stock orders for the part to the ratio of the corresponding average number of units of the part expected to be in the inventory to the historical average ratio of units per order for the part;

storing the slope table for each part;

retrieving the slope tables for all the parts and determining a slope which is common to each slope table and for which the sum of expected part investments for each part corresponding to the slope is equal to the selected inventory investment constraint, each expected part investment being the product of the corresponding average number of units of the part expected to be in the inventory and the cost of the part;

determining a minimum unit replenishment quantity and a safety unit quantity for each part capable of effecting the part service level for the part corresponding to the determined common slope; and outputting the minimum unit replenishment quantity and the safety unit quantity for each part.

12. A method for controlling the number of units of each of a plurality of different parts in an inventory, the method comprising operating a computer to receive a selected inventory investment constraint, further operating the computer to receive and store a part data table for each part, wherein each part data table relates part data for the part to forecast data for the part, the part data for each part including the number of units of the part in the inventory, the cost of the part, and a historical average ratio of units per order for the part, each order being for at least one unit of the part, the forecast data including a forecast unit demand for the part and an average number of units of the part expected to be in the inventory for each of a plurality of part service levels for the part, each part service level for each part representing an expected fraction of the orders for the part which can be filled from the inventory, further operating the computer to retrieve the part data table for each part and determine a slope table for each part which relates each of the plurality of part service levels for the part to an expected number of fillable-from-stock orders for the part and a slope for the part, each expected number of fillable-from-stock orders for the part being the product of the corresponding part service level and the ratio of the forecast unit demand for the part to the historical average ratio of units per order for the part, each slope for the part being the ratio of the change in the corresponding expected number of fillable-from-stock orders for the part to the change in the ratio of the corresponding average number of units of the part expected to be in the inventory to the historical average ratio of units per order for the part, further operating the computer to store the slope table for each part, further operating the computer to retrieve the slope tables for all the parts and determine a slope which is common to each slope table and for which the sum of expected part investments for each part corresponding to the slope is equal to the selected inventory investment constraint, each expected part investment being the product of the corresponding average number of units of the part expected to be in the inventory and the cost of the part, further operating the computer to determine a minimum unit replenishment quantity and a safety unit quantity for each part capable of effecting the part service level for the part corresponding to the determined common slope, and further operating the computer to output the minimum unit replenishment quantity and the safety unit quantity for each part.

13. The method of claim 12 wherein the forecast unit demand for each part is normally distributed.

14. A method implemented on a computer system for controlling the number of units of each of a plurality of different parts in an inventory having an inventory investment constraint, wherein the computer system comprises a memory, a processor operatively coupled to the memory, and an output operatively coupled to the memory and the processor, the method comprising the steps of:

providing a part data table for each part stored in the memory;

retrieving the part data table for each part from the memory with the processor;

determining for each part with the processor a plurality of average numbers of units of the part expected to be in the inventory and a plurality of expected numbers of fillable-from-stock orders for the part corresponding to the part data table for the part;

determining for all the parts with the processor the average number of units of the parts expected to be in the inventory for which corresponding marginal changes in the expected number of fillable-from-stock orders for each of the parts are equal and for which the sum of expected part investments for each of the parts is equal to the inventory investment constraint;

determining for each part with the processor a minimum unit replenishment quantity and a safety unit quantity capable of effecting the determined average number of units of the part expected to be in the inventory; and outputting on the output the minimum unit replenishment quantity and the safety unit quantity for each part.

15. The method of claim 14 wherein the marginal change in the expected number of fillable-from-stock orders for each part is a weighted average of at least a first factor and a second factor, wherein the first factor is the change expected in the expected number of fillable-from-stock orders for the part for each change in the product of the average number of units of the part expected to be in the inventory times the cost of the part, wherein the second factor is the change expected in the expected number of fillable-from-stock orders for the part for each change in the ratio of the average number of units of the part expected to be in the inventory to a historical ratio of units per order for the part.

16. The method of claim 15 wherein the first and second factors are normalized.

17. The method of claim 14 wherein the step of determining the average number of units of the parts expected to be in the inventory comprises:

determining a plurality of slopes for each part which are equal to the ratio of the rate of change of the expected number of fillable-from-stock orders for the part to the rate of change of the ratio of the corresponding average number of units of the part expected to be in the inventory to a historical average ratio of units per order for the part;

determining a slope from the plurality of slopes for each part which is common to each part and for which the sum of the expected part investments for each of the parts is equal to the inventory investment constraint; and determining the average number of units of each part expected to be in the inventory corresponding to the determined common slope.

18. A method implemented on a computer system for controlling the number of units of each of a plurality of different parts in an inventory, the computer system comprising a memory, an input device, an output device, and a processor operatively coupled to the memory, the input device, and the output device, the method comprising:

collecting part data for each part in the inventory, the part data for each part including the number of units of the part in the inventory, the cost of the part, and a historical average ratio of units per order for the part, each order being for at least one unit of the part;

receiving and storing the part data for each part;

receiving a plurality of part service levels for each part and a selected inventory investment constraint, each part service level for each part representing an expected fraction of the orders for the part which can be filled from the inventory;

retrieving the part data for each part and determining a part data table for each part which relates forecast data for the part to the part data for the part and the plurality of part service levels for the part, the forecast data for each part including a forecast unit demand for the part and an average number of units of the part expected to be in the inventory for each of the plurality of part service levels for the part;

storing the part data table for each part;

retrieving the part data table for each part and determining a slope table for each part which relates each of the plurality of part service levels for the part to an expected number of fillable-from-stock orders for the part and a slope for the part, each expected number of fillable-from-stock orders for the part being the product of the corresponding part service level and the ratio of the forecast unit demand for the part to the historical average ratio of units per order for the part, each slope for the part being the ratio of the change in the corresponding expected number of fillable-from-stock orders for the part to the change in a corresponding expected part investment, each expected part investment being the product of the corresponding average number of units of the part expected to be in the inventory and the cost of the part;

storing the slope table for each part;

retrieving the slope tables for all the parts and determining a slope which is common to each slope table and for which the sum of the expected part investments for each part corresponding to the slope is equal to the selected inventory investment constraint;

determining a minimum unit replenishment quantity and a safety unit quantity for each part capable of effecting the part service level for the part corresponding to the determined common slope;

outputting the minimum unit replenishment quantity and the safety unit quantity for each part; and when the number of units of a part in the inventory is less than or equal to the safety unit quantity, supplying at least a number of units of the part equal to the minimum unit replenishment quantity for the part from a supply source to the inventory.

19. The method of claim 18 wherein the forecast unit demand for each part is normally distributed.

20. A method implemented on a computer system for controlling the number of units of each of a plurality of different parts in an inventory, the computer system comprising a memory, an input device, an output device, and a processor operatively coupled to the memory, the input device, and the output device, the method comprising:

collecting part data for each part in the inventory, the part data for each part including the number of units of the part in the inventory and the cost of the part;

receiving and storing the part data for each part;

receiving a plurality of part service levels for each part and a selected inventory investment constraint, each part service level for each part representing an expected fraction of ordered units of the part which can be supplied from the inventory;

retrieving the part data for each part and determining a part data table for each part which relates forecast data for the part to the part data for the part and the plurality of part service levels for the part, the forecast data for each part including a forecast unit demand for the part and an average number of units of the part expected to be in the inventory for each of the plurality of part service levels for the part;

storing the part data table for each part;

retrieving the part data table for each part and determining a slope table for each part which relates each of the plurality of part service levels for the part to an expected number of fillable-from-stock ordered units for the part and a slope for the part, each expected number of fillable-from-stock ordered units for the part being the product of the corresponding part service level and the forecast unit demand for the part, each slope for the part being the ratio of the change in the corresponding expected number of fillable-from-stock ordered units for the part to the change in the corresponding average number of units of the part expected to be in the inventory;

storing the slope table for each part;

retrieving the slope tables for all the parts and determining a slope which is common to each slope table and for which the sum of expected part investments for each part corresponding to the slope are equal to the selected inventory investment constraint, each expected part investment being the product of the corresponding average number of units of the part expected to be in the inventory and the cost of the part;

determining a minimum unit replenishment quantity and a safety unit quantity for each part capable of effecting the part service level for the part corresponding to the determined common slope;

outputting the minimum unit replenishment quantity and the safety unit quantity for each part; and when the number of units of a part in the inventory is less than or equal to the safety unit quantity, supplying at least a number of units of the part equal to the minimum unit replenishment quantity for the part from a supply source to the inventory.

21. The method of claim 20 wherein the forecast unit demand for each part is normally distributed.

* * * * *